United States Patent
Smith et al.

(10) Patent No.: US 7,311,000 B2
(45) Date of Patent: Dec. 25, 2007

(54) WIND SPEED MEASUREMENT APPARATUS AND METHOD

(75) Inventors: David Arthur Smith, Haverfordwest (GB); Michael Harris, Malvern (GB)

(73) Assignee: Qinetiq Limited (GB)

( * ) Notice: Subject to any disclaimer, the term of this patent is extended or adjusted under 35 U.S.C. 154(b) by 87 days.

(21) Appl. No.: 10/564,005

(22) PCT Filed: Jul. 9, 2004

(86) PCT No.: PCT/GB2004/002988

§ 371 (c)(1),
(2), (4) Date: Jan. 9, 2006

(87) PCT Pub. No.: WO2005/008284

PCT Pub. Date: Jan. 27, 2005

(65) Prior Publication Data

US 2006/0179934 A1    Aug. 17, 2006

(30) Foreign Application Priority Data

Jul. 11, 2003    (GB) .................................. 0316241.9

(51) Int. Cl.
*G01F 13/00* (2006.01)
(52) U.S. Cl. .................................. 73/170.11
(58) Field of Classification Search .............. 73/170.11
See application file for complete search history.

(56) References Cited

U.S. PATENT DOCUMENTS

| | | | |
|---|---|---|---|
| 3,728,748 A | 4/1973 | Roehler | |
| 4,649,388 A * | 3/1987 | Atlas | 342/26 D |
| 4,712,108 A * | 12/1987 | Schwab | 342/26 D |
| 4,735,503 A * | 4/1988 | Werner et al. | 356/28.5 |
| 4,965,572 A | 10/1990 | Adamson | |
| 5,367,371 A | 11/1994 | Krawczyk | |
| 5,724,125 A | 3/1998 | Ames | |
| 5,796,471 A | 8/1998 | McKay et al. | |
| 5,872,535 A | 2/1999 | Jordan et al. | |
| 6,141,086 A | 10/2000 | Vahala et al. | |
| 6,916,219 B2 * | 7/2005 | Tokhtuev et al. | 441/29 |
| 2002/0109630 A1 | 8/2002 | Law | |

FOREIGN PATENT DOCUMENTS

| | | |
|---|---|---|
| GB | 2123240 | 1/1984 |
| GB | 2176965 | 1/1987 |
| SU | 1023240 | 5/1981 |
| WO | WO 02/50565 | 6/2002 |

OTHER PUBLICATIONS

Hardesty et al., "Doppler-lidar-measurements of wind and turbulance in the marine boundary layer", Conference Article, Conference Proceedings. Second Topical Symposium on Combined Optical-Microwave Earth and Atomospher Sensing, Conference Proceedings Sensing, Atlanta, GA (Apr. 3-6, 1995).

* cited by examiner

*Primary Examiner*—Max Noori
(74) *Attorney, Agent, or Firm*—McDonnell Boehnen Hulbert & Berghoff LLP

(57) ABSTRACT

A buoyant platform apparatus, such as a buoy, is described that comprises a laser radar (lidar) wind speed measurement device. The lidar is arranged to make wind velocity measurements at one or more remote probe volumes of known position relative to said platform. The wind speed measurement apparatus may further comprise motion sensing means that, in use, monitor motion of the platform allowing wind speed at an absolute position in space to be measured. Wind velocity data may also be compensated for platform movement.

20 Claims, 2 Drawing Sheets

WIND SPEED MEASUREMENT APPARATUS AND METHOD

BACKGROUND OF THE INVENTION (1) Field of the Invention

This invention relates to a method and apparatus for wind speed measurements using a laser radar (lidar) wind speed measurement system. More particularly, the invention relates to wind speed measurement apparatus for use on floating platforms such as buoys.

(2) Description of the Art

At present, there is much interest in the exploitation of renewable energy resources in an attempt to reduce the greenhouse gases produced by burning fossil fuels. One type of renewable energy resource that has received much attention is wind power.

Land based wind farms comprising a number of wind turbines have been used commercially to produce energy for many years. However, finding sites that are suitable for such wind farms has proved problematic, especially in the light of local environmental objections. Recently, this has led to the development of off-shore wind farms where the environmental impact is greatly reduced. Furthermore, such wind farms are able to exploit the higher wind speeds that are typically found at sea.

Selecting suitable off-shore sites for wind turbine placement is particularly important to ensure the energy generated by the turbine is sufficient to offset the relatively high construction costs. However, the process of determining suitable off-shore sites has been hindered by a number of problems that are not encountered when assessing the suitability of land based sites. For example, prior to the siting of a wind turbine on land it is typical to log the wind speed at the proposed site for a prolonged period of time (e.g. twelve months or more) in order to ensure the wind regime is suitable. Such wind speed measurements, which are preferably made at the height above the ground at which the turbine blades will be located, are typically performed on land by erecting a mast that carries a suitable mechanical or sonic anemometer. Similar types of measurement have proved difficult to make off-shore.

It has previously been attempted to log off-shore wind speed data using mast mounted mechanical or sonic anemometers analogous to those used on land. The masts have been directly fixed to the sea bed or mounted on buoyant platforms such as barges or buoys. As the blades of off-shore wind turbines are typically located many tens (possibly hundreds) of meters above the surface of the water the mast should, ideally, be sufficiently tall to locate the conventional anemometer in a similar position. However, the cost of forming the necessary foundations in the sea bed to directly support a mast can be prohibitive. Similarly, it has only been possible to make periodic measurements using manned barges because mooring a barge at a potential site for a long period of time is simply too costly. Furthermore, the construction of buoys sufficiently stable for carrying the relatively tall mast and conventional anemometer arrangement has proved technically challenging.

More details about some of the problems associated with wind speed data collection at sites located offshore are given by Grainger, W., Gammidge, A, and Smith, D., in the paper entitled "Offshore wind data for wind farms" published in the proceedings of the twentieth British Wind Energy Association wind energy conference ("wind energy—switch to wind power"), ISBN-1-86058-374-4.

In addition to mast mounted conventional anemometry systems, ground based lidar systems are known. Lidar systems provide wind speed data by measuring the Doppler shift imparted to laser light that is scattered from natural aerosols (e.g. dust, pollen, water droplets etc.) present in air. An example of a $CO_2$ laser based lidar system is described by Vaughan and Forrester in Wind Engineering, Vol 13, No 1, 1989, pp 1-15; see in particular section 8 thereof. More recently, lower cost optical fibre based lidar devices of the type described in Karlsson et al, Applied Optics, Vol. 39, No. 21, 20 Jul. 2000 have been developed.

Lidar systems measure the Doppler shift imparted to reflected radiation within a certain remote probe volume and can thus only acquire wind velocity data in a direction parallel to the transmitted/returned laser beam. In the case of a lidar device located on the ground, it is possible to measure the true (3D) wind velocity vector a given distance above the ground by scanning the lidar in a controlled manner; for example using a conical scan. This enables the wind vector to be intersected at a range of known angles thereby allowing the true wind velocity vector to be constructed. Ground based scanned lidar systems have been used to measure wind sheer, turbulence and wake vortices for many years in both military and civil applications; for example see Laser Doppler Velocimetry Applied to the measurement of Local and Global Wind, J. M. Vaughan and P. A. Forrester, Wind Engineering, Vol. 13, No. 1, 1989.

SUMMARY OF THE INVENTION

According to a first aspect of the invention, a buoyant platform apparatus comprises a wind speed measurement device and is characterised in that the wind speed measurement device comprises a laser radar (lidar) arranged to make wind velocity measurements at one or more remote probe volumes of known position relative to said buoyant platform.

The present invention thus provides a buoyant platform apparatus (i.e. a platform that will float on water) that can be quickly and easily deployed at any desired location in an expanse of water and can provide reliable wind speed measurements. In particular, the buoyant platform may be readily deployed off-shore. The present invention thus overcomes the need to construct towers rising from the sea-bed on which conventional anemometers are mounted, and allows the wind profiles of potential off-shore wind farm sites to be assessed at a much lower cost than previously possible. Furthermore, the apparatus of the present invention not only meets the needs of the wind power industry but could also replace wind data collection systems as used, for instance, in the oil and gas industry and in meteorological forecasting.

Advantageously, the wind speed measurement device is arranged to acquire wind velocity measurements from remote probe volumes at a plurality of positions such that a true wind velocity vector can be determined. For example, the lidar may conveniently comprises a beam scanning means. In this way, a plurality of remote probe volumes of known position relative to the platform can be provided. The inclusion of a scanning means is advantageous, but by no means essential. The scanning means may advantageously be arranged to cause the laser beam to scan in a conical fashion and such an approach would ensure that wind data could be recorded even under extreme calm conditions. However, if simplicity is important, then movement of the platform alone (e.g. the tip and tilt caused by wave motion) could provide a passive beam scanner, useable under most conditions, that has lower power consumption. Passive beam scanning would obviously prove less useful when there is little or no platform (e.g. wave) motion, however this typically corresponds to occasions when there is less wind and the data during such periods is usually of least interest.

Advantageously, the wind speed measurement device further comprises motion sensing means that, in use, monitor motion of the buoyant platform. The motion sensing means thus allow an absolute position of the remote probe volume of the lidar to be determined for each of the wind velocity measurements. Herein, the term absolute position is a position in space that is defined relative to a fixed point on Earth; for example a position measured relative to the ground or the sea-bed. It should also be noted that the accuracy with which the relative position of the remote probe volume is translated into an absolute remote probe volume position will depend on the accuracy of the motion sensing means. Typically, the accuracy of the motion sensing means should be around one degree in angle and a few centimeters per second in velocity (in any direction).

The present invention thus provides a wind velocity measurement apparatus mounted on or in a buoyant platform that can provide reliable data on the wind velocity at absolute positions in space. Advantageously, wind velocity measurements acquired from remote probe volumes at a plurality of absolute positions allow a true wind velocity vector to be determined in a given region of space (e.g. at the potential location of a wind turbine).

Advantageously, the motion sensing means monitors platform velocity such that acquired wind velocity measurements for the one or more remote probe volumes can be corrected for any relative platform velocity.

The motion sensing means may comprise any one or more of a number of motion sensors. The type of motion sensors used in the motion sensing means will depend on the type of motion adopted by the platform and the importance of the effect of this motion on the data being acquired. The combination of sensors enables the position of the lidar probe volume to be determined for each measurement.

Conveniently, the motion sensing means comprises a rotation sensor. In other words, the compass direction (i.e. the bearing in which the apparatus is pointing) is measured. The motion sensing means may conveniently comprise a roll sensor, for example a two dimensional roll sensor. This allows the inclination of the platform to be determined and hence the wind direction to be calculated.

Advantageously, the motion sensing means comprises a heave sensor. This sensor is used to determine the vertical velocity of the measurement platform and hence allows any change in vertical position of the platform to be established. The measured vertical velocity component may also be used to correct the vertical component of the measured wind speed.

The motion sensing means may also advantageously comprises a translation sensor. This sensor is used to determine the horizontal velocity of the measurement platform (in two dimensions) allowing the platform position to be determined. The measured horizontal velocity may also be used to correct the horizontal component of measured wind speed.

A global positioning system (GPS) could also be provided to monitor the absolute position of the platform. A translation sensor would generally be unnecessary if the platform was constrained to remain within a defined area. For example, if the platform to which the wind speed measurement apparatus attached was a tethered buoy. However, approximate positional information as provided by current low-cost GPS systems would be enable the location of a drifting platform to be monitored (e.g. for oceanographic studies) or simply to guard against mooring failure or theft.

It would be appreciated by a skilled person that a single sensor could be provided to perform all or a combination of the sensor functions described above. For example, a single absolute positioning and orientation sensor could be used for measurement of rotation, roll, heave and position if sufficiently accurate and affordable.

Conveniently, a processing means is provided to receive the output of the motion sensing means and to calculate the absolute position of the remote probe volume of each wind velocity measurement. In addition, the processing means may advantageously be arranged to compensate for platform velocity (as measured by the motion sensing means) in calculating wind speed. Preferably, data storage means are also included.

The processing means and data storage means may be provided by a personal computer. The acquired data may be periodically transmitted to a remote system via known communication means; e.g. GSM, satcoms, SW radio or meteorburst. If more detailed data is required then higher bandwidth communication systems may alternatively be employed. Very detailed information could be stored locally on a magnetic or optical storage medium for subsequent collection by a service engineer.

Advantageously, the lidar is bistatic. Bistatic lidar systems derive their name from having separate transmit and receive optics. Monostatic lidar systems are also known and are so called because they have common transmit and receive optics. The non-parallel transmit and receive beams of a bistatic system are particularly advantageous because they can be arranged to intersect at a certain point thereby accurately defining the remote probe volume (i.e. the area in space from which Doppler wind speed measurements are acquired). Although confinement of the probe volume may lead to a reduction in the strength of the returned signal for distributed targets, the noise generated by spurious reflections is greatly reduced compared with monostatic systems.

Preferably, the lidar is optical fibre based. For example, the lidar may be of the type described by Karlsson et al, Applied Optics, Vol. 39, No. 21, 20 Jul. 2000. Fibre based lidar systems are advantageous compared with $CO_2$ laser based systems because of their small size, low power consumption and robustness.

Advantageously, the lidar is mounted within the buoyant platform. A transparent window may be provided within the platform through which the laser can be directed. Alternatively, the apparatus may be attached to an external portion of the platform. Advantageously, the lidar is arranged to have a substantially vertical look direction.

The buoyant platform (which may also be termed a floating platform) conveniently comprises a buoy. The term buoy is well known to those skilled in the art as meaning an unmanned and unpowered buoyant platform. The buoy may be tethered in position or may drift with the tide. A buoy of the present invention may be used off-shore in the ocean/sea or may be used in inland expanses of water such as lakes, rivers etc. The buoyant platform may alternatively comprise any platform that is arranged to float on water; for example, a boat, ship etc.

Means may also be provided to clean the output port through which the radiation generated by the lidar is emitted. For example, a wiper or a wash-wipe system may be provided.

According to a second aspect of the invention, a method of determining wind velocity in the vicinity of a buoyant platform is provided and is characterised by the steps of (i) taking a laser radar (lidar) attached to the buoyant platform and (ii) using the lidar to acquire wind velocity measurements from one or more remote probe volumes of known position relative to the moveable platform.

Conveniently, the method further comprises the step of (iii) using motion sensing means to measure motion of said moveable platform. This enables the absolute position of the probe volume wind velocity measurement to be determined.

Conveniently, the method also comprises the additional step of (iv) acquiring wind velocity measurements from a plurality of probe volumes of known position relative to the moveable platform. Advantageously, the method also comprises the step of correcting the acquired wind velocity measurements to take into account the velocity of the platform as measured by the motion sensing means.

DESCRIPTION OF THE FIGURES

The invention will now be described, by way of example only, with reference to the following drawings in which.

DETAILED DESCRIPTION OF THE INVENTION

Figure 1:
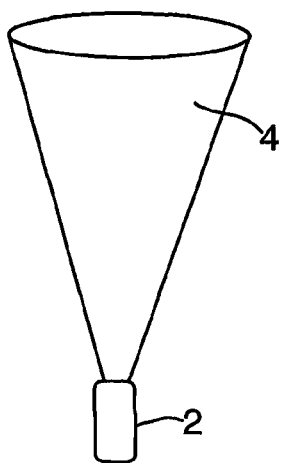
FIG. 1 shows a prior art ground based scanned laser anemometer system.

Referring to FIG. 1, a prior art lidar 2 is shown. The lidar system has a transmit beam and a receive beam that overlap so as to define a certain probe volume in space. The lidar 2 is arranged such that the remote probe volume performs a conical scan 4 thereby allowing the wind velocity to be intersected at a range of angles enabling the true velocity vector to be deduced for a region in space. Other scanning patterns are known and can be used to determine the true wind velocity vector, provided that the lidar range and pointing (or look) direction is always known with a sufficient degree of accuracy. Such lidar systems have been used to measure wind shear, turbulence and wake vortices for many years in both military and civil applications.

To make reliable wind speed measurements in fixed regions in space (i.e. in a fixed region relative to the ground) prior art lidar systems are secured in position and scanning means are provided to alter the look direction of the lidar thereby scanning the probe volume through a region of space as described above. It is also known to make wind speed measurements at fixed positions relative to a moving platform (i.e. in a region that moves relative to the ground), such as an aircraft.

It has thus been assumed by those skilled in the art that lidar systems are incapable of providing reliable information about the wind speed of a fixed region in space when located on a moving platform. In particular, the need for a fixed platform has meant that lidar systems have not been contemplated for making measurements at absolute positions in space from platforms that have significant and unpredictable motion, such as off-shore buoys or barges.

Figure 2:
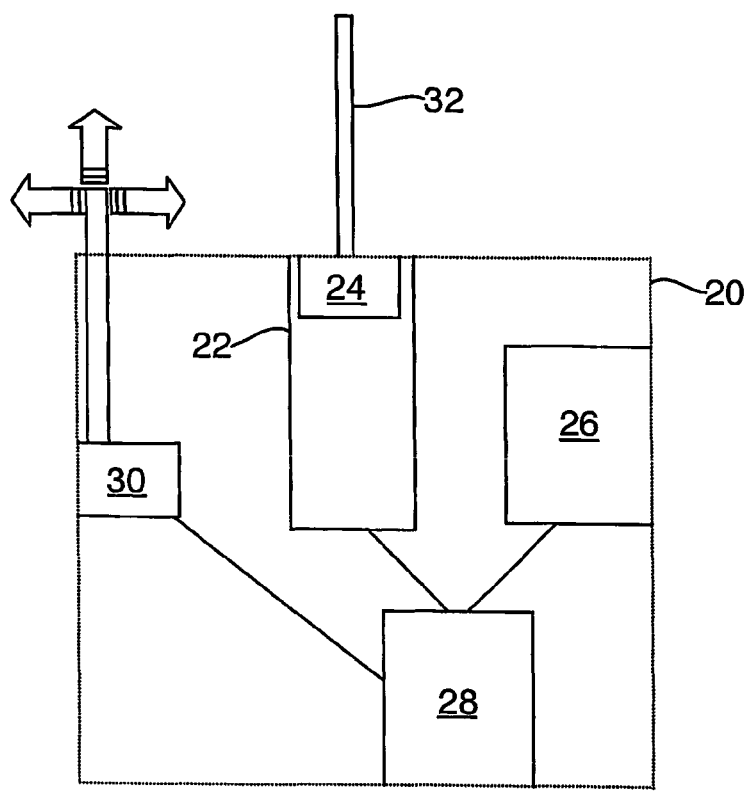
FIG. 2 shows a wind speed measurement system of the present invention.

Referring to FIG. 2, a wind speed measurement apparatus 20 of the present invention is shown which overcomes the requirement for mounting the lidar system on a fixed platform. The apparatus 20 comprises a lidar system 22 incorporating a scanning means 24, motion sensing means 26, a computer 28 and a data transmitter system 30.

Figure 3:
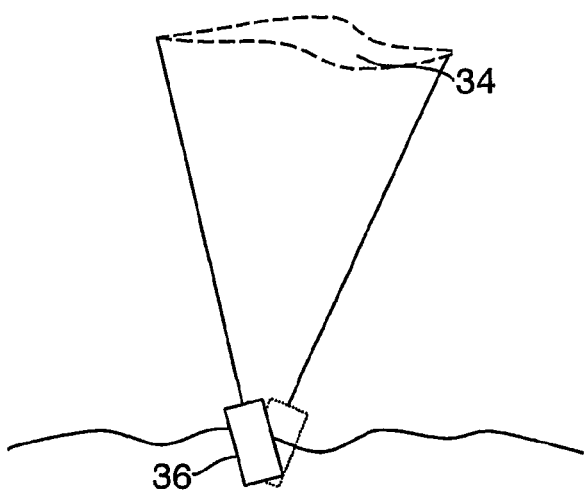
FIG. 3 illustrates the scan pattern of the device shown in FIG. 2.

The lidar system 22 has a fixed range and emits and receives laser radiation (as indicated by the beam 32) in a known direction relative to the apparatus 20; i.e. the probe volume of the device relative to the apparatus 20 is known. In this example, the scanning means 24 can scan the beam 32 in a known conical path relative to the apparatus 20. However, platform movement means that the scanned beam will also be subjected to additional pseudo-random scan perturbations. For example, if the apparatus were mounted on an off-shore buoy the tip and tilt caused by wave motion would alter the absolute path in space that is traced by the beam 32. This is illustrated in FIG. 3 which shows the scan pattern 34 of a buoy 36 that comprises wind speed measurement apparatus 20 of the type described with reference to FIG. 2.

Although a fixed range lidar is described, a lidar system may also be used which incorporates a means by which the range (e.g. height) of the measurement probe may be varied to enable wind fields to be interrogated at varying heights. This may be accomplished, for example by varying the position of intercept in a bi-static system, by varying the focus in a monostatic system, or by employing a range-gated pulsed lidar system.

Previously, it would have been thought necessary to provide some means of stabilising the platform (e.g. ballast tanks etc) or lidar system (e.g. by providing a gimballed mount). However, in accordance with the invention, the motion sensing means 26 is arranged to measure the orientation of the apparatus such that the absolute position of the probe volume during the scan is known. It is then possible for the computer 28 to calculate the three dimensional wind vector in a region of space from the wind speed measurements taken at the plurality of probe volumes of known absolute position.

The scanning means 24 may comprise a typical prior art optical scanning system. For example, depending upon the area to be scanned, one might consider a Taster or vector scan using angled mirrors driven by powerful motors. At the other extreme one could leave out the scanning means altogether relying instead on, say, natural wave motion to provide a pseudo-random scanning pattern.

Of the mechanical scanning options available, perhaps the simplest mechanism is a single mirror or an optical prism rotated about a single axis. This would cause the laser beam to scan in a conical fashion and such an approach would ensure that wind data could be recorded even under extreme calm conditions.

Any motion of the platform to which the wind speed measurement apparatus is attached will obviously affect the position of the probe volume in which wind speed measurements are made. In the case of a buoy mounted wind measurement system, the rotation (i.e. compass direction) and roll (i.e. inclination) of the buoy will affect the probe sample position. If a lidar system is used that has a fixed range, the heave (i.e. vertical displacement) will alter the absolute height at which measurements are made and can thus be considered to affect the accuracy of the wind velocity data calculated for a region in space. Furthermore, it should be noted that the vertical velocity of the platform will affect the Doppler shift that is measured from a probe volume in a given region of space. However, the instantaneous velocity of platform motion can be measured and used to correct the velocity measured for a given probe volume.

Rotation, roll and heave can be monitored using several established motion sensing techniques such as magnetic compasses, gyroscopes and accelerometers. Translation of a tethered buoy will be relatively small and will not significantly affect probe position, but instantaneous platform velocity should be compensated for to provide accurate horizontal wind speed measurements. However, for a drifting buoy as used in meteorological or oceanographic studies, some form of positioning system would be necessary. For example, a Global Positioning System (GPS) could be used.

The data from each orientation sensor (e.g. rotation, roll, heave and translation) forming the motion sensing means 26 are fed to the computer 28 along with a wind speed signal from the lidar system 22. The computer then calculates the wind speed at various probe volumes and determines a three dimensional wind vector. The computer may be configured to average data over periods of many minutes. Alternatively, it can be arranged to acquire detailed information about the structure of the wind on a time scale of tens of milliseconds.

The acquired data (averaged or detailed) may be stored by the computer 28, for example on a hard disk drive, and periodically downloaded to a remote system via the data transmitter system 30. A receiver (not shown) may also be provided for receiving control commands to alter the type of data being acquired. Alternatively, the data may be continually transmitted to a remote system and the integral computer 28 may be low complexity or substituted by a dedicated processor.

If time averaged data is output by the system, the transmitter system 30 may comprise an existing commercial communications systems, e.g. GSM, satcoms, SW radio or meteorburst. However, if more detailed data is also required then higher bandwidth communication systems may need to be employed, but these too are readily available, although they may consume more electrical power.

At present; fibre-based lidar systems require about two hundred Watts of power. This, plus that required for the motion sensors, navigation lights, communications and, possibly, a heater will push the power budget to perhaps four hundred Watts. For an autonomous buoy-mounted lidar this power will need to be generated semi-continuously. Various options exist for generating the power required; for example solar, wave, wind, diesel/gas, fuel cells or batteries etc. A combination of such energy sources could also be used to provide continuous operation.

To ensure reliable operation, it may also be necessary to introduce some form of cleaning system (not shown) for the external optics (e.g. a lens or window). A simple wiper system as used for instance on car headlamps would probably be adequate for most situations. A refinement might be to include a washer system (with the consequent added complexity of maintaining an appropriate reservoir of cleaning fluid). Alternatively, a simple transparent foil could be unrolled across the external optic; much like the devices used by motor sports drivers to keep clear visibility in adverse conditions. This approach would overcome the problem of salt build up causing unwanted scattering of the laser beam.

Figure 4:
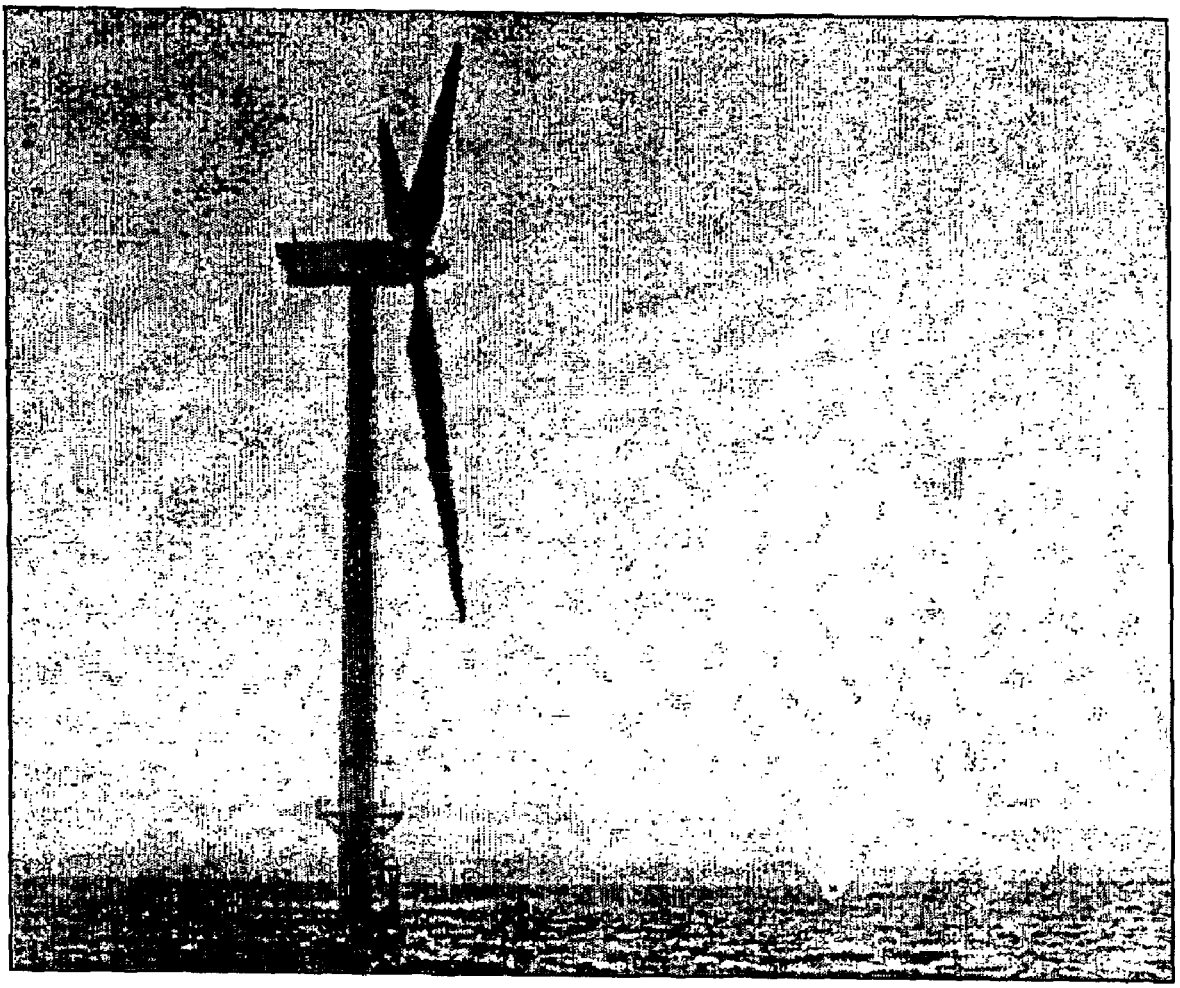
FIG. 4 illustrates a buoy incorporating a wind speed measurement system of the type described with reference to FIG. 2.

Referring finally to FIG. 4, a graphic illustration of a buoy incorporating a wind measurement apparatus deployed in front of an off-shore wind turbine is shown. Numerous alternative uses for the wind speed measurement apparatus of the present invention would be apparent to a person skilled in the art.

The invention claimed is:

1. A buoyant platform apparatus comprising a wind speed measurement device, wherein the wind speed measurement device comprises a laser radar (lidar) arranged to make wind velocity measurements at one or more remote probe volumes of known position relative to said buoyant platform and a motion sensor that, in use, monitors motion of the buoyant platform.

2. An apparatus according to claim 1 wherein the wind speed measurement device is arranged to acquire wind velocity measurements from remote probe volumes at a plurality of positions such that a true wind velocity vector can be determined.

3. An apparatus according to claim 1 wherein the lidar further comprises a beam scanner.

4. An apparatus according to claim 3 wherein the beam scanner is arranged to provide a conical scan.

5. An apparatus according to claim 1 wherein the buoyant platform apparatus is a buoy.

6. An apparatus according to claim 1 wherein the motion sensor comprises a rotation sensor.

7. An apparatus according to claim 1 wherein the motion sensor comprises a roll sensor.

8. An apparatus according to claim 1 wherein the motion sensor comprises a heave sensor.

9. An apparatus according to claim 1 wherein the motion sensor comprises a translation sensor.

10. An apparatus according to claim 1 wherein a processor is additionally provided to receive the output of the motion sensor and to calculate the absolute position of the remote probe volume of each wind velocity measurement.

11. An apparatus according to claim 10 wherein the processor receives the platform velocity measured by the motion sensor and compensates said wind velocity measurements for relative platform velocity.

12. An apparatus according to claim 1 wherein a data storage is additionally provided.

13. An apparatus according to claim 1 wherein the lidar is bistatic.

14. An apparatus according to claim 1 wherein the lidar is optical fibre based.

15. An apparatus according to claim 1 wherein the wind speed measurement device is mounted within the buoyant platform apparatus.

16. An apparatus according to claim 1 wherein means are provided to clean the optical port through which the radiation transmitted and received by the lidar passes.

17. An apparatus according to claim 1 wherein the lidar has a substantially vertical look direction during use.

18. A method of determining wind velocity in the vicinity of a buoyant platform characterised by the steps of (i) taking a laser radar (lidar) attached to the buoyant platform (ii) using the lidar to acquire wind velocity measurements from one or more remote probe volumes of known position relative to the moveable platform and (iii) using a motion sensor to measure motion of said moveable platform.

19. A method according to claim 18 and comprising the additional step of (iv) acquiring wind velocity measurements from a plurality of probe volumes of known position relative to the moveable platform.

20. A method according to claim 18 and comprising the additional step of (v) compensating the acquired wind velocity measurements for the relative velocity of the platform.

* * * * *